United States Patent
Griyage et al.

(10) Patent No.: US 10,325,055 B2
(45) Date of Patent: Jun. 18, 2019

(54) SIGNAL INTEGRITY DELAY UTILIZING A WINDOW BUMP-BASED AGGRESSOR ALIGNMENT SCHEME

(71) Applicant: Mentor Graphics Corporation, Wilsonville, OR (US)

(72) Inventors: Dhananjay Kumar Griyage, Sunnyvale, CA (US); Mohan Rangan Govindaraj, Pleasanton, CA (US)

(73) Assignee: Mentor Graphics Corporation, Wilsonville, OR (US)

( * ) Notice: Subject to any disclaimer, the term of this patent is extended or adjusted under 35 U.S.C. 154(b) by 92 days.

(21) Appl. No.: 14/678,788

(22) Filed: Apr. 3, 2015

(65) Prior Publication Data

US 2016/0292344 A1 Oct. 6, 2016

(51) Int. Cl.
  *G06F 17/50* (2006.01)
  *H04B 3/32* (2006.01)

(52) U.S. Cl.
  CPC ........... *G06F 17/5081* (2013.01); *H04B 3/32* (2013.01); *G06F 2217/82* (2013.01); *G06F 2217/84* (2013.01)

(58) Field of Classification Search
  CPC .................................................. G06F 17/5081
  USPC .......................................................... 716/115
  See application file for complete search history.

(56) References Cited

U.S. PATENT DOCUMENTS

| | | | | |
|---|---|---|---|---|
| 6,510,540 B1 * | 1/2003 | Krauter | ............... | G06F 17/5036 716/115 |
| 7,251,797 B2 * | 7/2007 | Becer | .................. | G06F 17/5031 716/113 |
| 7,469,391 B2 * | 12/2008 | Carrere | ............... | G06F 17/5036 716/108 |
| 7,562,323 B1 * | 7/2009 | Bai | ..................... | G06F 17/5036 703/2 |
| 7,685,549 B2 * | 3/2010 | Sinha | .................. | G06F 17/5036 703/16 |
| 7,739,098 B2 * | 6/2010 | Kucukcakar | ........ | G06F 17/5031 702/125 |

* cited by examiner

*Primary Examiner* — Jack Chiang
*Assistant Examiner* — Brandon Bowers
(74) *Attorney, Agent, or Firm* — Mentor Graphics Corporation

(57) ABSTRACT

This application discloses a computing system configured to determine a timing window for reception of a signal propagated through a victim channel in a circuit design, generate an aggressor window bump for each noise bump capable of being induced on the victim channel by one or more aggressor channels, determine a delta delay corresponding to the timing window for the signal propagated through the victim channel based, at least in part, on one or more of the aggressor window bump, and utilize the delta delay corresponding to the timing window for the signal to determine whether the victim channel operates within a timing constraint associated with the circuit design.

20 Claims, 9 Drawing Sheets

SIGNAL INTEGRITY DELAY UTILIZING A WINDOW BUMP-BASED AGGRESSOR ALIGNMENT SCHEME

TECHNICAL FIELD

This application is generally related to electronic design automation and, more specifically, to signal integrity delay determination utilizing a window bump-based aggressor alignment scheme.

BACKGROUND

Designing and fabricating electronic systems typically involves many steps, known as a design flow. The particular steps of a design flow often are dependent upon the type of electronic system being designed, its complexity, the design team, and the fabricator or foundry that will manufacture the electronic system. The design flow typically starts with a specification for a new electronic system, which can be transformed into a logical design. The logical design can model the electronic system at a register transfer level (RTL), which is usually coded in a Hardware Design Language (HDL), such as System Verilog, Very high speed integrated circuit Hardware Design Language (VHDL), System C, or the like. The logical design of the electronic system can be analyzed to confirm that it will accurately perform the functions desired for the electronic system. This analysis is sometimes referred to as "functional verification."

After the accuracy of the logical design is confirmed, it can be converted into a device design by synthesis software. The device design, which is typically in the form of a schematic or netlist, describes the specific components, such as transistors, resistors, and capacitors, which can be used in the electronic system, along with their interconnections. This device design generally corresponds to the level of representation displayed in conventional circuit diagrams.

A designer, for example, using a place-and-route tool, can place portions of the device design relative to each other in a geographic design environment. While these device design portions can correspond to segments of code in a hardware description language, they typically are shown in the geographic design environment as blocks representing components of the electrical system. Once the blocks have been placed relative to each other, wiring lines can be routed between the blocks. These wiring lines represent the interconnections, such as data signal interconnections and clock signal interconnections, which can be formed between the components of the electrical system.

This place-and-route process is usually iterative, with the placement of the device design components and routing of the wiring lines being analyzed to determine whether they conform to the specification of the electronic system. For example, the place-and-route tool can analyze the placement of the device design components and routing of the wiring lines to determine signal integrity for the various wiring lines. Signal integrity refers to the degree of immunity a device design has to crosstalk effects, for example, caused by parasitic capacitance between adjacent channels, wires, or nets in the device design. This cross-coupling can cause changes in signal slew rates and delays that can affect timing closure for the device design, and also cause signal glitches that can induce logic errors.

Delay computation of signaling on a wiring line suffering from crosstalk—often represented as capacitive-couple Resistance-Capacitance (RC) network—is a specific type of analysis performed by the place-and-route tool. This type of analysis considers both variations in signal delay on the wiring line, sometimes called a victim channel, as well as a presence of noise bumps from one or more aggressor channels and variations on when the noise bumps can arrive on the victim channel. The place-and-route tool typically iteratively simulates the device design with multiple different temporal alignments of signal switching events on the victim channel and signal switching events on one or more aggressor channels that can produce crosstalk noise on the victim channel in order to arrive at worst and best signal delay on the victim channel. Since today's electronic systems can be small geometry and include low supply voltage scenarios, each simulation of the device design, includes a very accurate and resource-intensive analysis to avoid missing a potential timing violation—which can result in a failure of the electronic system.

SUMMARY

This application discloses tools and mechanisms for implementing a signal integrity delay determination utilizing a window bump-based aggressor alignment scheme. According to various embodiments, the tools and mechanisms can determine a timing window for reception of a signal propagated through a victim channel in a circuit design, generate an aggressor window bump for each noise bump capable of being induced on the victim channel by one or more aggressor channels, determine a delta delay corresponding to the timing window for the signal propagated through the victim channel based, at least in part, on one or more of the aggressor window bumps, and utilize the delta delay corresponding to the timing window for the signal to determine whether the victim channel operates within a timing constraint associated with the circuit design. Embodiments of implementing the signal integrity delay determination utilizing a window bump-based aggressor alignment scheme will be described in greater detail below.

DETAILED DESCRIPTION

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads.

Figure 1:
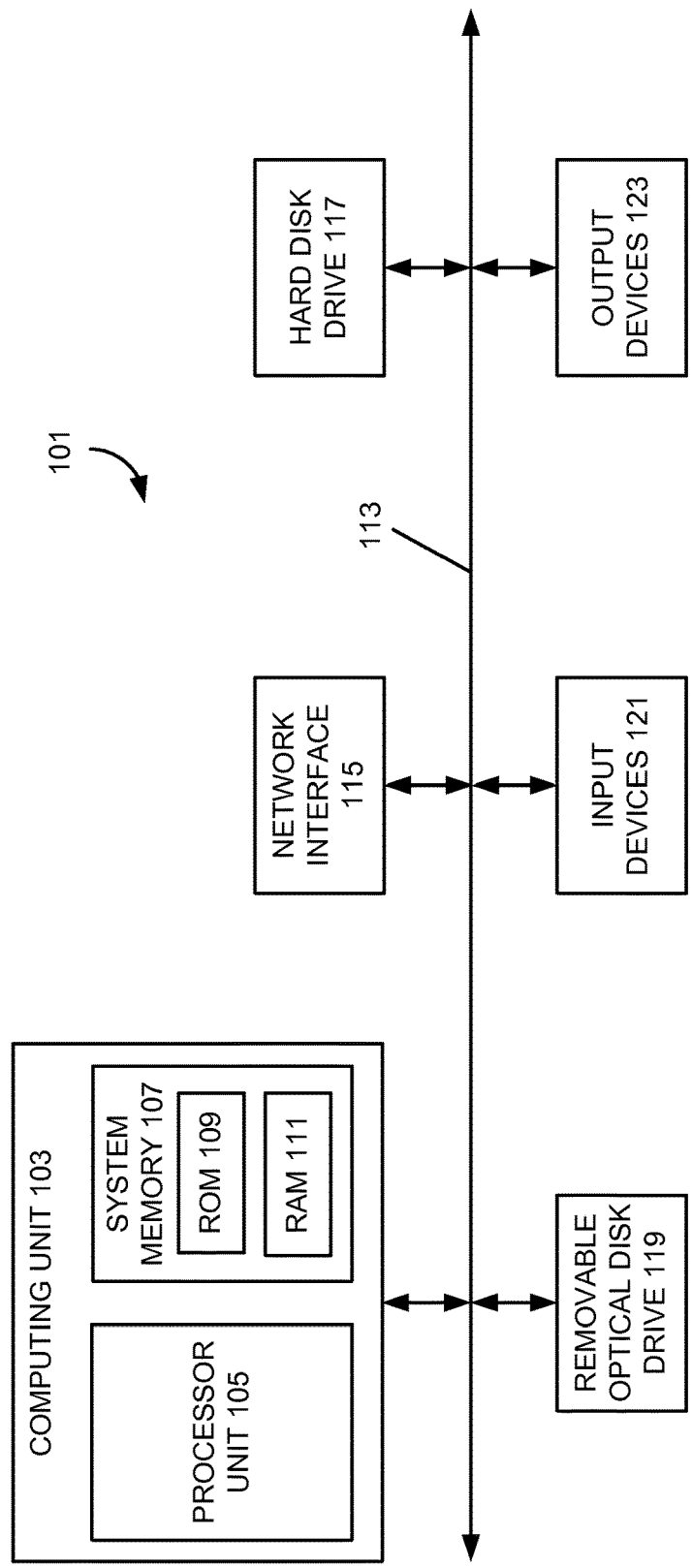
FIGS. 1 and 2 illustrate an example of a computer system of the type that may be used to implement various embodiments of the invention.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
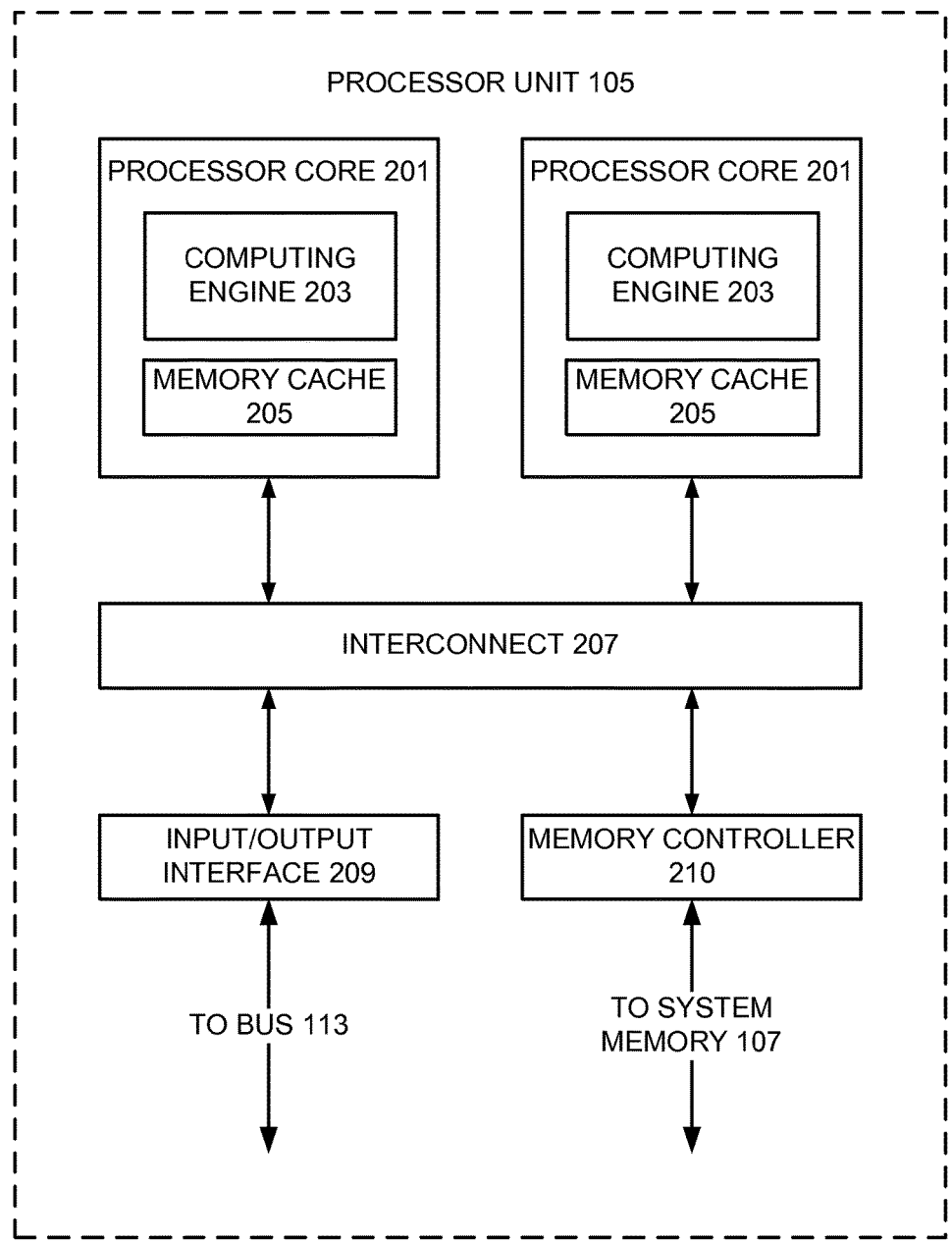

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 113. Similarly, the memory controller 211 controls the exchange of information between the processor unit 201 and the system memory 107. With some implementations of the invention, the processor units 201 may include additional components, such as a high-level cache memory accessible shared by the processor cores 201.

It also should be appreciated that the description of the computer network illustrated in FIG. 1 and FIG. 2 is provided as an example only, and it not intended to suggest any limitation as to the scope of use or functionality of alternate embodiments of the invention.

Signal Integrity Determination

Figure 3:
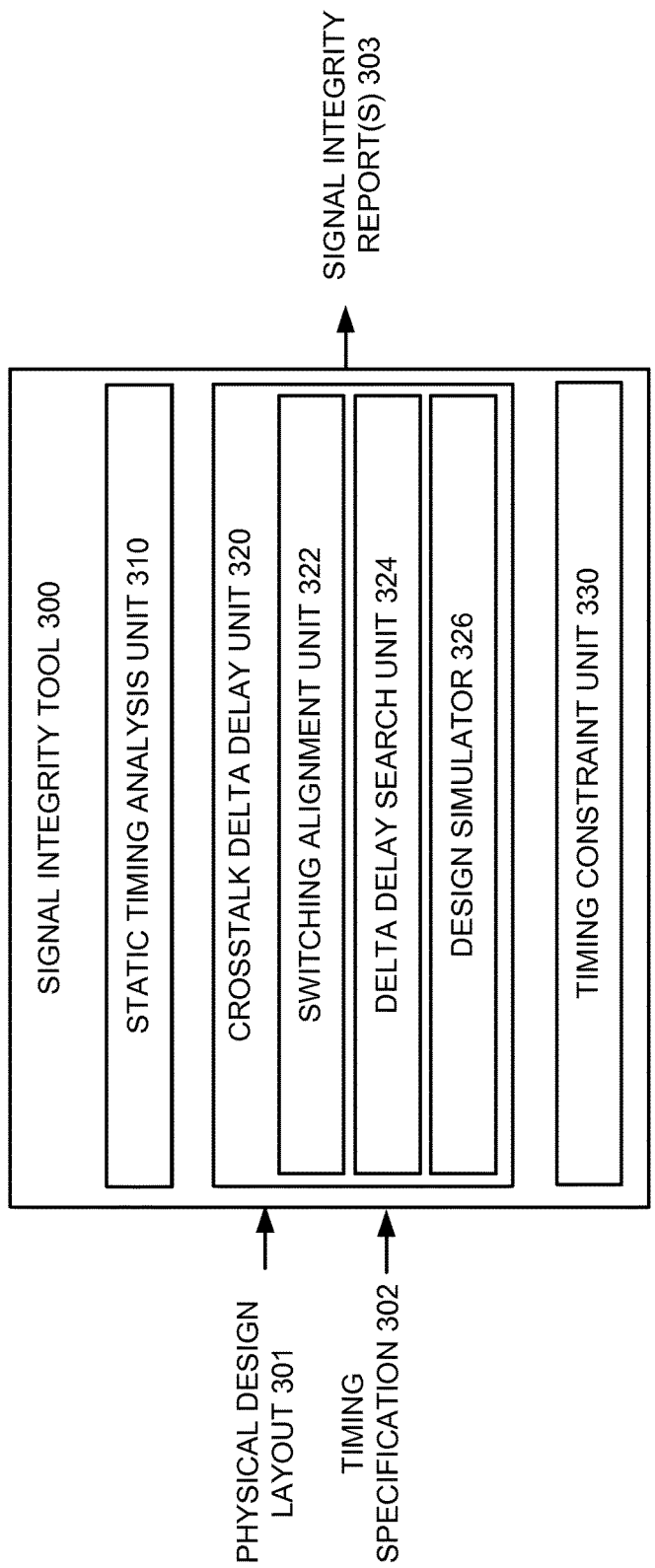
FIG. 3 illustrates an example of a signal integrity tool implementing a window bump-based aggressor alignment scheme according to various embodiments of the invention.

FIG. 3 illustrates an example of a signal integrity tool 300 implementing a window bump-based aggressor alignment scheme according to various embodiments of the invention. Referring to FIG. 3, the signal integrity tool 300 can receive a physical design layout 301 that describes an electronic device in terms of planar geometric shapes corresponding to patterns of metal, oxide, or semiconductor layers that make up components of the electronic device. In some embodiments, the physical design layout 301 can describe or model the electronic device in a Graphic Database System II (GDSII) format, Open Artwork System Interchange Standard (OASIS) format, a Library Exchange Format (LEF), a Design Exchange Format (DEF), or the like.

The signal integrity tool 300 can include a static timing analysis unit 310 to analyze the physical design layout 301 and determine "ideal" or noiseless delays through the different paths or channels in the electronic device described in the physical design layout 301. For example, the electronic device can include multiple components or logic gates that can transmit signals to other components or logic gates in the electronic device. The static timing analysis unit 310 can compute delays between the transmission and reception of signals between these components or logic gates in the electronic device, for example, without simulation of the physical design layout 301. Since each channel or signal path can have a range of possible signal delay, the static timing analysis unit 310 can determine a noiseless timing window for each channel or signal path. Although FIG. 3 shows the signal integrity tool 300 including the static timing analysis unit 310, in some embodiments, the static timing analysis unit 310 can be external to the signal integrity tool 300.

Figure 4:
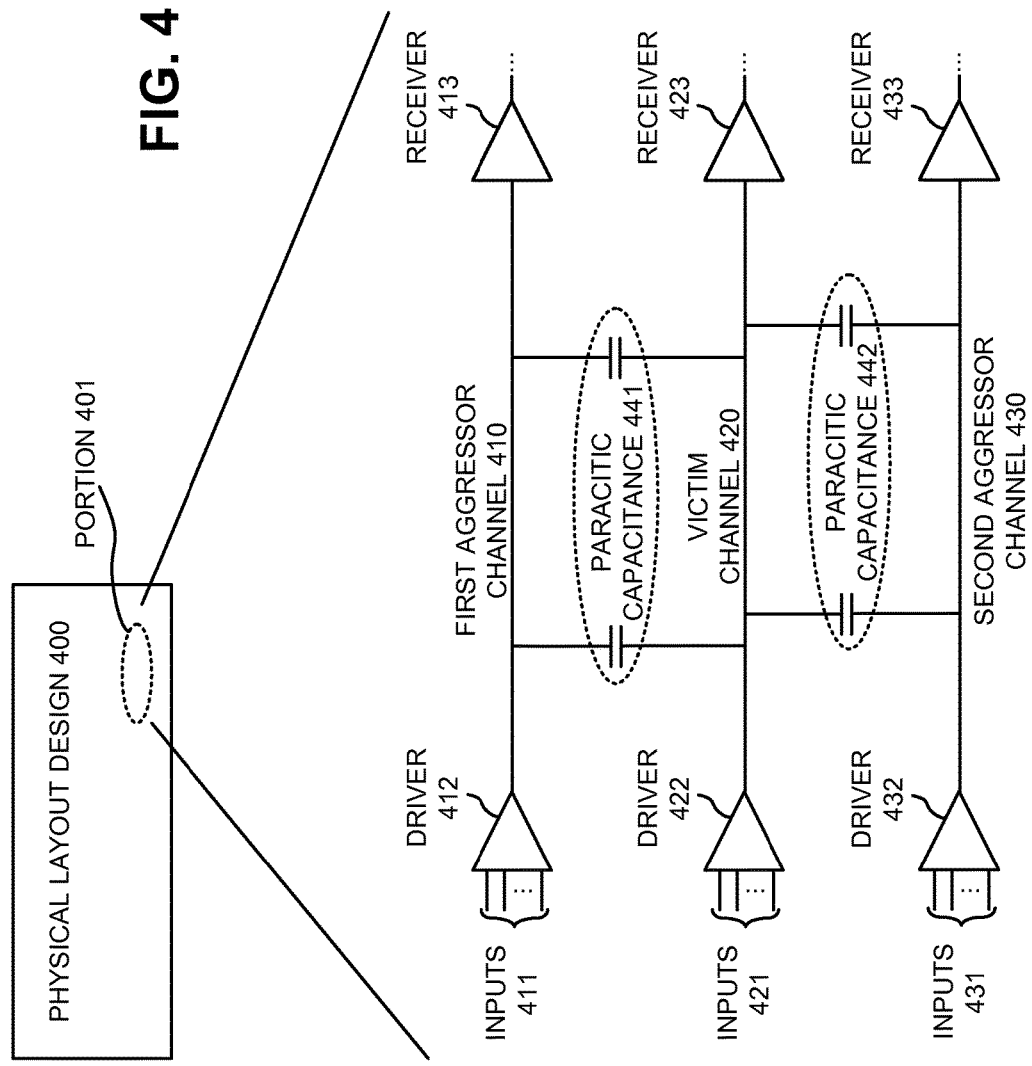
FIG. 4 illustrates an example physical layout design having a victim channel and multiple aggressor channels that may be implemented according to various embodiments of the invention.

FIG. 4 illustrates an example physical layout design 400 that may be implemented according to various embodiments of the invention. Referring to FIG. 4, the physical layout design 400 can include multiple channels, such as routes, wires, interconnects, or the like, in an electronic device. The physical layout design 400 can represent these channels as capacitive-couple Resistance-Capacitance (RC) networks. As an illustrative example, a portion 401 of the physical layout design 400 is shown as including a victim channel 420 capable of propagating a signal between a driver 422 and a receiver 423, which, in some embodiments, can be electronic components or gates in the physical layout design 400. The driver 422 can receive one or more inputs 421 that can prompt the driver 422 to induce the signal by switching a voltage on the victim channel 420, for example, from a logical high level to a logical low level or vice versa. The switch in the voltage on the victim channel 420 can be received at the receiver 423 after a delay that can vary based on a number of factors, such as which of the inputs 421 prompts the switching in the driver 422, the states of the other inputs 421, whether the signal switches from a logical high level to a logical low level or vice versa, or the like. This variable delay can result in an earliest arrival time and a latest arrival time for the signal received at the receiver 423 when the victim channel 420 is noiseless. The earliest arrival time and the latest arrival time for the signal received at the receiver 423 can form a noiseless timing window for reception of the signal on the victim channel 420 by the receiver 423.

The portion 401 of the physical layout design 400 can also include multiple aggressor channels, such as a first aggressor channel 410 and a second aggressor channel 430, which can operate similarly to victim channel 420. For example, the first aggressor channel 410 can propagate a signal between a driver 412 and a receiver 413, which, in some embodiments, can be electronic components or gates in the physical layout design 400. The driver 412 can receive one or more inputs 411 that can prompt the driver 412 to induce the signal by switching a voltage on the first aggressor channel 410, for example, from a logical high level to a logical low level or vice versa. The switch in the voltage on the first aggressor channel 410 can be received at the receiver 413 after a delay that can vary based on a number of factors, such as which of the inputs 411 prompts the switching in the driver 412, the states of the other inputs 411, whether the signal switches form logical high level to a logical low level or vice versa, or the like. The timing window on the first aggressor channel 410 can be defined as an arrival time difference between an earliest transition of a particular type appearing on an output of the driver 412 and a latest time for the same transition on an input of the receiver 413.

The second aggressor channel 430 can propagate a signal between a driver 432 and a receiver 433, which, in some embodiments, can be electronic components or gates in the physical layout design 400. The driver 432 can receive one or more inputs 431 that can prompt the driver 432 to induce the signal by switching a voltage on the first aggressor channel 430, for example, from a logical high level to a logical low level or vice versa. The switch in the voltage on the second aggressor channel 430 can be received at the receiver 433 after a delay that can vary based on a number of factors, such as which of the inputs 431 prompts the switching in the driver 432, the states of the other inputs 431, whether the signal switches form logical high level to a logical low level or vice versa, or the like. This variable delay can be described as a second aggressor timing window for reception of the signal on the second aggressor channel 430 by the receiver 433.

Based on the configuration of the portion 401, the victim channel 420 can be capacitively coupled to the first aggressor channel 410 and the second aggressor channel 430 via parasitic capacitances 441 and 442, respectively. These parasitic capacitances 441 and 442 can allow signaling on the first aggressor channel 410 and the second aggressor channel 430, respectively, to induce or impose crosstalk noise on the victim channel 420. In some embodiments, when this crosstalk noise occurs while a signal from the driver 422 is propagating to the receiver 423 on the victim channel 420, the receiver 423 can detect reception of the signal earlier or later than the noiseless timing window for the victim channel 420.

Referring back to FIG. 3, the signal integrity tool 300 can include a crosstalk delta delay unit 320 to determine earliest and latest arrival times of signals on channels or signal paths in the presence of crosstalk noise. These earliest and latest arrival times can be computed or determined from delta delays relative to a noiseless timing window for the channel or signal path. For example, when the crosstalk delta delay unit 320 determines that crosstalk noise causes a signal on a victim channel to have a worst-case early arrival time that is before the earliest arrival time specified in the noiseless timing window, the crosstalk delta delay unit 320 can identify a value for an early-arrival delta delay to be a difference between the worst-case early arrival time and the early edge of the noiseless timing window. Conversely, when the crosstalk delta delay unit 320 determines that crosstalk noise causes a signal on the victim channel to have a worst-case late arrival time that is after the latest arrival time specified in the noiseless timing window, the crosstalk delta delay unit 320 can identify a value for a late-arrival delta delay to be a difference between the worst-case late arrival time and the late edge of the noiseless timing window. The crosstalk delta delay unit 320 can utilize the worst-case early arrival time and the worst-case late arrival time in the presence of crosstalk noise to determine a noisy timing window for the channel or signal path.

In some embodiments, the crosstalk delta delay unit 320 can determine the worst-case early arrival time and the worst-case late arrival time of signals on a victim channel through an iterative process of simulating the physical design layout 301 with various temporal alignments between switching of a voltage signal on the victim channel and switching of voltage signals on one or more aggressor channels that may induce noise on the victim channel. For example, the crosstalk delta delay unit 320 can utilize a design simulator 326 to simulate the physical design layout 301 with an initial switching alignment for the victim and aggressor channels, and then iteratively adjust the switching alignment for the victim and aggressor channels until determining the worst-case early arrival time and the worst-case late arrival time of signals on the victim channel in the presence of crosstalk noise. Although FIG. 3 shows the signal integrity tool 300 including the design simulator 326, in some embodiments, the design simulator 326 can be external to the signal integrity tool 300.

The crosstalk delta delay unit 320 can include a switching alignment unit 322 to select an initial alignment between switching of the voltage signal on the victim channel and switching of the voltage signals on one or more aggressor channels that may induce noise on the victim channel. In some embodiments, the switching alignment unit 322 can determine an initial alignment corresponding to an early arrival of signals on the victim channel in the presence of crosstalk noise, and determine an initial alignment corresponding to a late arrival of signals on the victim channel in the presence of crosstalk noise. Embodiments of how the switching alignment unit 322 can determine the initial switching alignment(s) will be described below in greater detail.

The crosstalk delta delay unit 320 can include a delta delay search unit 324 to utilize the initial switching alignment as a starting point in the iterative simulation process. The delta delay search unit 324 can prompt or direct the design simulator 326 to simulate the physical design layout 301 with the initial switching alignment for the victim and aggressor channels. Based on the results of the simulation, the delta delay search unit 324 can re-align the switching of the voltage signal on the victim channel and switching of the voltage signals on one or more aggressor channels, and prompt the design simulator 326 to re-perform the simulation with the re-aligned switching. The delta delay search unit 324 can repeat this re-alignment and simulation process until determining the worst-case early arrival time or the worst-case late arrival time of signals on the victim channel in the presence of crosstalk noise.

In some embodiments, the crosstalk delta delay unit 320 can detect a glitch on a victim channel caused, at least in part, by a presence of crosstalk noise on the victim channel. The glitch can correspond to a change in a voltage signal on the victim channel due, in part, to the crosstalk noise, which can slow down or speed up the transition of the voltage signal.

The signal integrity tool 300 can include a timing constraint unit 330 to compare the worst-case early arrival time and the worst-case late arrival time in the presence of crosstalk noise, for example, as determined with the delta delays, with the timing specification 302 for the physical design layout 301. The timing specification 302 can describe constraints on the electronic device represented by the physical design layout 301. In some embodiments, the signal integrity tool 300 can, based on the comparison, determine whether the signals on channels in the physical design layout 301 can arrive too early or too late to conform with the timing specification 302 for the electronic device represented by the physical design layout 301. The timing constraint unit 330 can generate one or more signal integrity reports 303, which can indicate whether signaling on the channels in the physical design layout 301 conform with the timing specification 302. In some embodiments, the timing constraint unit 330 can include a detection of any glitches by the crosstalk delta delay unit 320 in the one or more signal integrity reports 303.

Figure 5A:
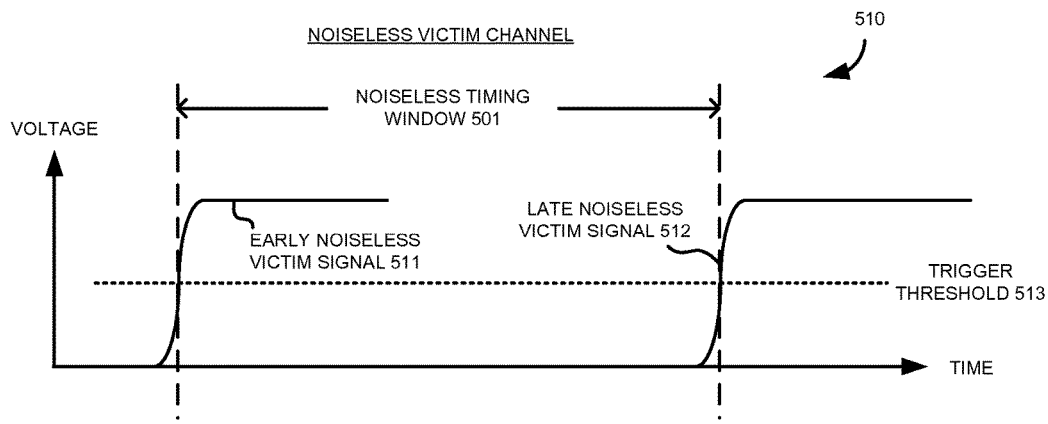
FIGS. 5A-5G illustrate example timing diagrams utilized to determine switching alignments according to various examples of the invention.

FIGS. 5A-5G illustrate example timing diagrams utilized to determine switching alignments according to various examples of the invention. Referring to FIG. 5A, a timing diagram 510 shows a voltage-time representation of a noiseless timing window 501 on a victim channel, for example, determined by a static timing analysis on a physical design layout. The noiseless timing window 501 can correspond to a range of times that a switching signal driven onto the victim channel by a driver can be received by a receiver from the victim channel. An early noiseless victim signal 511 can correspond to a switching signal, in absence of crosstalk noise, having an earliest arrival time at the receiver or shortest delay between the driver and the receiver over the victim channel. A late noiseless victim signal 512 can correspond to a switching signal, in absence of crosstalk noise, having a latest arrival time or longest delay between the driver and the receiver over the victim channel. As discussed above in FIG. 4, the variation on arrival time or delay for a switching signal on the victim channel can correspond to which input to the driver for the victim channel causes a switching event on the victim channel, the states of the other inputs to the driver, and whether the signal switches from a logical high level to a logical low level or vice versa.

The timing diagram 510 also shows a trigger threshold 513 that corresponds to a voltage level that the receiver for the victim channel utilizes to detect signaling events on the victim channel. Although the trigger threshold 513 is set to approximately halfway between a logical high voltage level and a logical low voltage level on the victim channel, in other embodiments, the trigger threshold 513 can be set to at least one different voltage level.

Figure 5B:
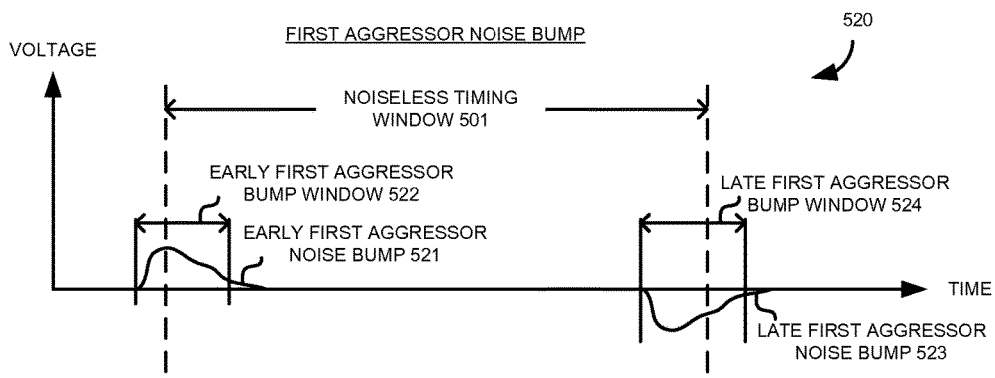

Referring to FIG. 5B, the timing diagram 520 shows a voltage-time representation of noise bumps that can be imposed on the victim channel by a first aggressor channel. The shape of the noise bumps and arrival time of the noise bumps relative to the noiseless timing window 501 can be determined from information generated by a static noise analysis on a physical design layout. Since the static noise analysis determines the shapes of the noise bumps as they would occur on a quiet victim channel, i.e., without other signals or induced noise on the victim channel, in some embodiments, the shape of the noise bumps can be different when induced on a victim channel that is not quiet.

The timing diagram 520 can show an early first aggressor noise bump 521 and range of time, called an early first aggressor bump window 522, which defines when that early first aggressor noise bump 521 can arrive relative to the noiseless timing window 501. The timing diagram 520 can show a late first aggressor noise bump 523 and range of time, called a late first aggressor bump window 524 corresponding to the first aggressor timing window, which defines when that late first aggressor noise bump 523 can arrive relative to the noiseless timing window 501. As discussed above, the variation on arrival time or delay for the noise bumps 521 and 523 on the victim channel can correspond to which input to a driver for the first aggressor channel causes a switching event on the first aggressor channel, the states of the other inputs to the driver, whether the signal switches from a logical high level to a logical low level or vice versa, a state and strength of the driver and the receiver for the victim channel, and parasitic resistance and capacitance of the coupled aggressor and victim channel.

Figure 5C:
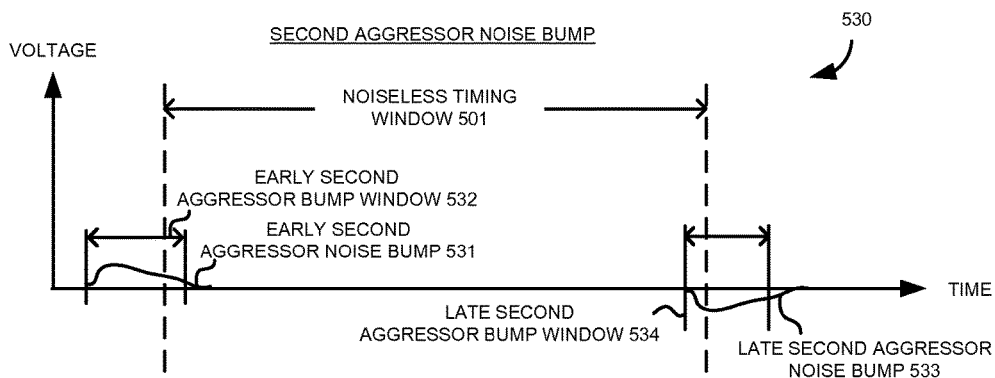

Referring to FIG. 5C, the timing diagram 530 shows a voltage-time representation of noise bumps that can be imposed on the victim channel by a second aggressor channel. The shape of the noise bumps and arrival time of the noise bumps relative to the noiseless timing window 501 can be determined from information generated by the static timing analysis on a physical design layout. Since the static noise analysis determines the shapes of the noise bumps as they would occur on a quiet victim channel, i.e., without other signals from the receiver of the victim channel or other aggressor channels, in some embodiments, the shape of the noise bumps can be different when induced on a victim channel that is not quiet.

The timing diagram 530 can show an early second aggressor noise bump 531 and range of time, called an early second aggressor bump window 532 corresponding to the second aggressor timing window, when that early second aggressor noise bump 531 can arrive relative to the noiseless timing window 501. The timing diagram 530 can show a late second aggressor noise bump 533 and range of time, called a late second aggressor bump window 534, when that late second aggressor noise bump 533 can arrive relative to the noiseless timing window 501. As discussed above, the variation on arrival time or delay for the noise bumps 531 and 533 on the victim channel can correspond to which input to a driver for the second aggressor channel causes a switching event on the second aggressor channel, the states of the other inputs to the driver, whether the signal switches from a logical high level to a logical low level or vice versa, a state and strength of the driver and the receiver for the victim channel, and parasitic resistance and capacitance of the coupled aggressor and victim channel.

Figure 5D:
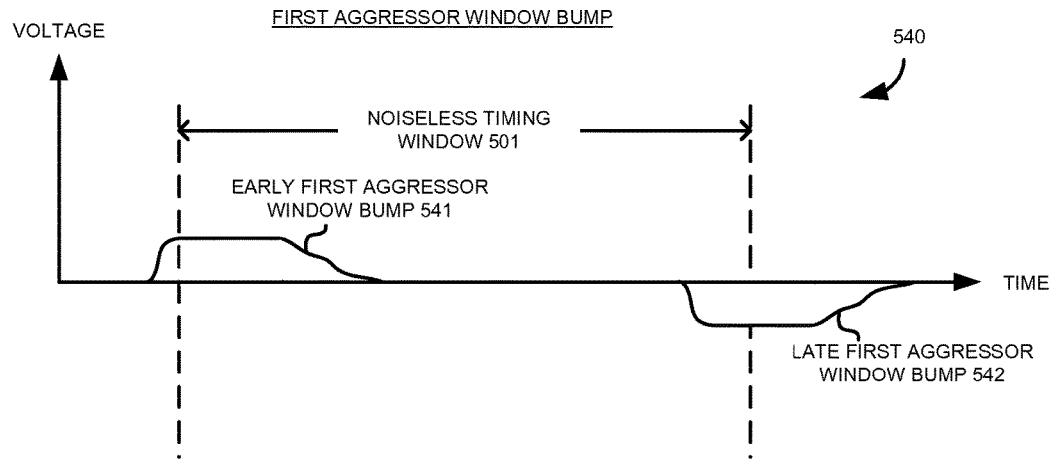

Referring to FIG. 5D, the timing diagram 540 shows a voltage-time representation of possible crosstalk noise that can be imposed on the victim channel by the first aggressor channel given the shape of noise bumps and when the first aggressor channel can induce those noise bumps on the victim channel. In some embodiments, since the early first aggressor noise bumps 521 from FIG. 5B can arrive on the victim channel at any time in the early first aggressor bump window 522 from FIG. 5B, the signal integrity tool 300 can superimpose or overlay the early first aggressor noise bumps 521 from FIG. 5B for each time that the early first aggressor noise bumps 521 can arrive in the early first aggressor bump window 522 from FIG. 5B. The signal integrity tool 300 can determine an early first aggressor window bump 541 based on the overlaid early first aggressor noise bumps 521. In some embodiments, the shape of the early first aggressor window bump 541 can correspond to peak voltage value of the overlaid early first aggressor noise bumps 521 for entire duration of the early first aggressor bump window.

In some embodiments, since the late first aggressor noise bumps 523 from FIG. 5B can arrive on the victim channel at any time in the late first aggressor bump window 524 from FIG. 5B, the signal integrity tool 300 can superimpose or overlay the late first aggressor noise bumps 523 from FIG. 5B for each time that the late first aggressor noise bumps 523 can arrive in the late first aggressor bump window 524 from FIG. 5B. The signal integrity tool 300 can determine a late first aggressor window bump 542 based on the overlaid late first aggressor noise bumps 523. In some embodiments, the shape of the late first aggressor window bump 542 can correspond to peak voltage value of the overlaid late first aggressor noise bump 523 for entire duration of the late first aggressor bump window.

Figure 5E:
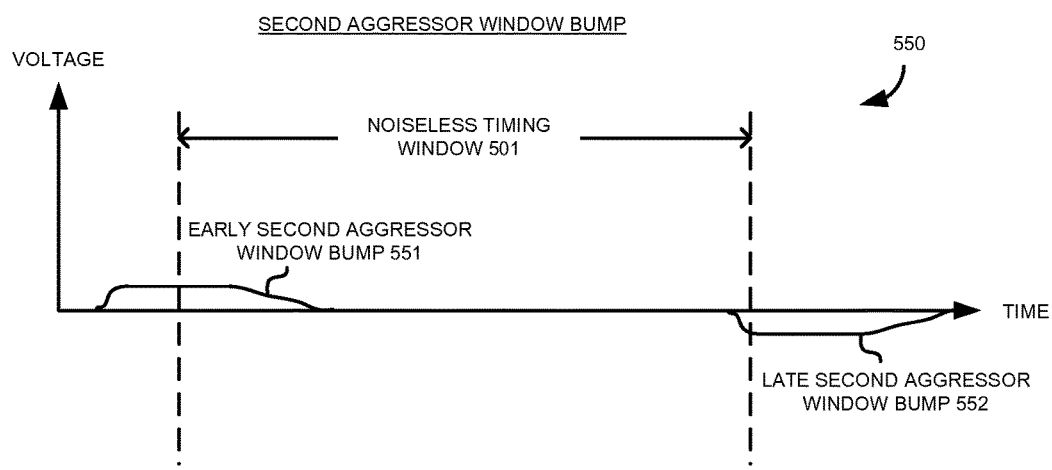

Referring to FIG. 5E, the timing diagram 550 shows a voltage-time representation of possible crosstalk noise that can be imposed on the victim channel by the second aggressor channel given the shape of noise bumps and when the second aggressor channel can induce those noise bumps on the victim channel. In some embodiments, since the early second aggressor noise bumps 531 from FIG. 5C can arrive on the victim channel at any time in the early second aggressor bump window 532 from FIG. 5C, the signal integrity tool 300 can superimpose or overlay the early second aggressor noise bumps 531 from FIG. 5C for each time that the early second aggressor noise bumps 531 can arrive in the early second aggressor bump window 532 from FIG. 5C. The signal integrity tool 300 can determine an early second aggressor window bump 551 based on the overlaid early second aggressor noise bumps 531. In some embodiments, the shape of the early second aggressor window bump 551 can correspond to peak voltage value of the overlaid early second aggressor noise bump 531 for entire duration of the early second aggressor bump window.

In some embodiments, since the late second aggressor noise bumps 533 from FIG. 5C can arrive on the victim channel at any time in the late second aggressor bump window 534 from FIG. 5C, the signal integrity tool 300 can superimpose or overlay the late second aggressor noise bumps 533 from FIG. 5B for each time that the late second aggressor noise bumps 533 can arrive in the late second aggressor bump window 534 from FIG. 5B. The signal integrity tool 300 can determine a late second aggressor window bump 552 based on the overlaid late second aggressor noise bumps 533. In some embodiments, the shape of the late second aggressor window bump 542 can correspond to peak voltage value of the overlaid late second aggressor noise bump 533 farthest from zero for entire duration of the late second aggressor bump window.

Figure 5F:
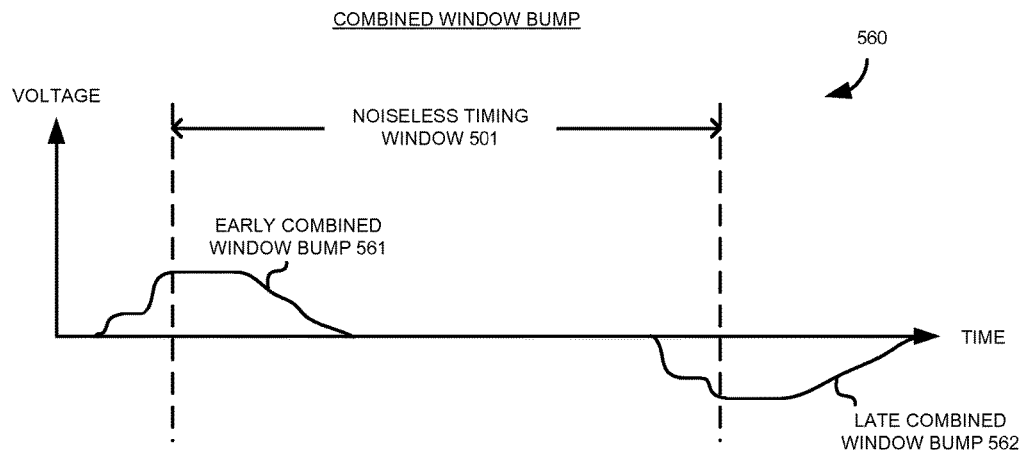

Referring to FIG. 5F, the timing diagram 560 shows a voltage-time representation of possible crosstalk noise that can be imposed on the victim channel by both the first aggressor channel and the second aggressor channel. In some embodiments, the signal integrity tool 300 can add or combine the early first aggressor window bump 541 with the early second aggressor window bump 551 to generate an early combined window bump 561. The early combined window bump 561 can correspond to an estimated worst case voltage magnitude for combination of noise bumps corresponding to the early edge of the noiseless timing window 501. Although FIGS. 5B-5F show crosstalk noise capable of being induced on the victim channel from two aggressor channels, based on the configuration of the physical design layout, any number of aggressor channels can induce crosstalk noise on the victim channel and have their crosstalk noise selectively included in the early combined window bump 561.

The signal integrity tool 300 also can add or combine the late first aggressor window bump 542 with the late second aggressor window bump 552 to generate a late combined window bump 562. The late combined window bump 562 can correspond to an estimated worst case voltage magnitude for combination of noise bumps corresponding to the late edge of the noiseless timing window 501. Although FIGS. 5B-5F show crosstalk noise capable of being induced on the victim channel from two aggressor channels, based on the configuration of the physical design layout, any number of aggressor channels can induce crosstalk noise on the victim channel and have their crosstalk noise selectively included in the late combined window bump 562.

Figure 5G:
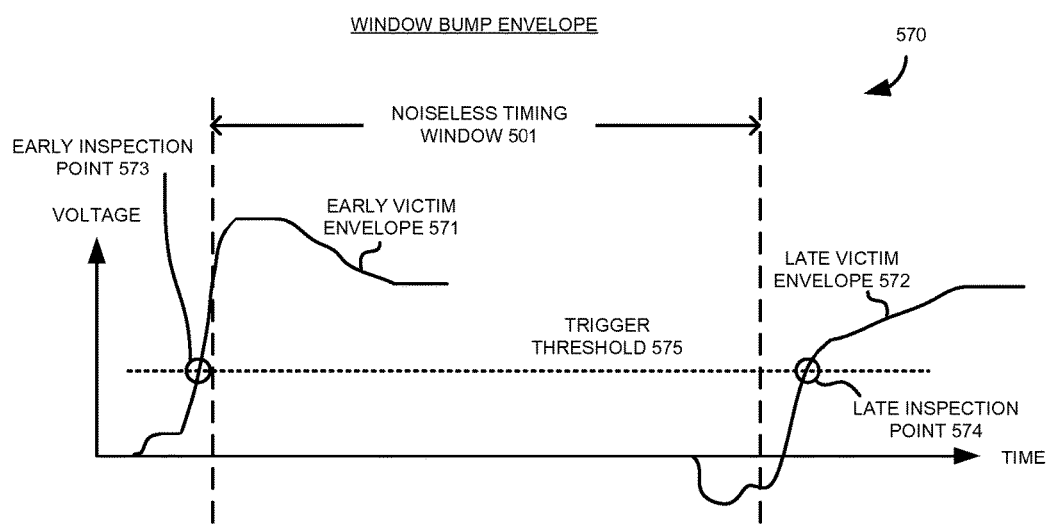

Referring to FIG. 5G, the timing diagram 570 shows a voltage-time representation of estimated noisy switching voltages on the victim channel. In some embodiments, the signal integrity tool 300 can add or combine the early noiseless victim signal 511 shown in FIG. 5A with the early combined window bump 561 shown in FIG. 5F to generate an early victim envelope 571. The early victim envelope 571 can be a metric corresponding to estimated magnitudes of switching voltages on the victim channel corresponding to the early edge of the noiseless timing window 501. The signal integrity tool 300 also can add or combine the late noiseless victim signal 512 shown in FIG. 5A with the late combined window bump 562 shown in FIG. 5F to generate a late victim envelope 572. The late victim envelope 572 can be a metric corresponding to estimated magnitudes of switching voltages on the victim channel corresponding to the late edge of the noiseless timing window 501.

In order to accurately determine an earliest and a latest possible time for switching signals to cross the trigger threshold 575 of the victim channel, the signal integrity tool 300 can simulate the physical design layout with different possible switching alignments for the drivers of the victim channel and any aggressor channels inducing crosstalk noise on the victim channel. The signal integrity tool 300 can determine initial switching alignments for both the early-side simulation and the late-side simulation based on the early victim envelope 571 and the late victim envelope 572, respectively. The timing diagram 570 shows a trigger threshold 575 that corresponds to a voltage level that a receiver for the victim channel utilizes to detect signaling events on the victim channel. Although the trigger threshold 575 is set to approximately halfway between a logical high voltage level and a logical low voltage level on the victim channel, in other embodiments, the trigger threshold 575 can be set to at least one different voltage level.

The location where the early victim envelope 571 crosses the trigger threshold 575 can be an early inspection point 573. The signal integrity tool 300 can identify the initial switching alignment for the early-side simulation by determining the specific temporal combination of driver switching times that generate the early noiseless victim signal 511 and at least one of the early first aggressor noise bump 521 and the early second aggressor noise bump 531 corresponding to at the early inspection point 573.

The location where the late victim envelope 572 crosses the trigger threshold 575 can be a late inspection point 574. The signal integrity tool 300 can identify the initial switching alignment for the late-side simulation by determining the specific temporal combination of driver switching times that generate the late noiseless victim signal 511 and at least one of the late first aggressor noise bump 521 and the late second aggressor noise bump 531 corresponding to the late inspection point 574.

The signal integrity tool 300 can perform the iterative simulation process on both the early-side and late-side of the noiseless timing window 501, starting with the initial switching alignments determined from the inspections points 573 and 574, in order to determine the delta delays. When the initial switching alignments do not provide the worst case delta delays for the victim channel, the signal integrity tool 300 can re-align the initial switching alignments within a range defined by the combined window bumps 561 and 562. By performing the operations in FIGS. 5D-5G, the signal integrity tool 300 can reduce a number of iterations in the simulation processes by identifying a limited range of potential switching alignments that can be utilized in the iterative simulation process, for example, corresponding to the duration of the combined window bumps 561 and 562, and by identifying initial switching alignments closer to the final switching alignments used to find the early and late delta delays for the victim channel.

Figure 6:
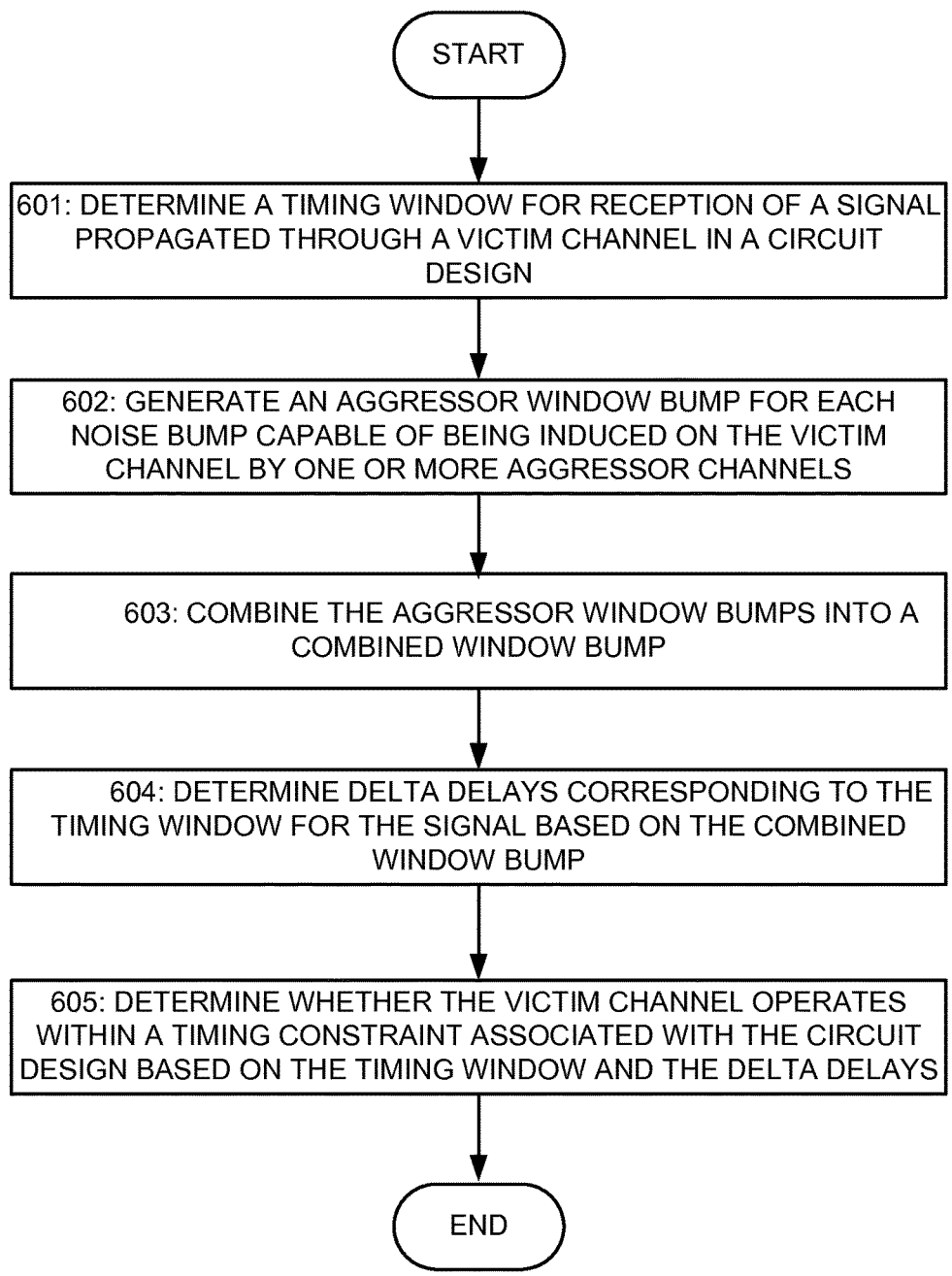
FIG. 6 illustrates a flowchart showing an example determination of signal integrity for a victim channel in a circuit design according to various examples of the invention.

FIG. 6 illustrates a flowchart showing an example determination of signal integrity for a victim channel in a circuit design according to various examples of the invention.

Referring to FIG. 6, in a block 601, a computing system can determine a timing window for reception of a signal propagated through a victim channel in a circuit design. In some examples, the computing system can implement static timing analysis, which analyzes the circuit design to determine the timing window for reception of the signal when the victim channel is noiseless.

In a block 602, the computing system can generate an aggressor window bump for each noise bump capable of being induced on the victim channel by one or more aggressor channels. In some embodiments, the computing system can identify the shape of each noise bump and when each noise bump can be induced on the victim channel. The computing system can then, for each noise bump, superimpose or overlay the shape of the noise bump corresponding to when each noise bump can be induced on the victim channel. Based on the overlaid noise bump shapes, the computing system can generate an aggressor window bump for each noise bump.

In a block 603, the computing system can combine the aggressor window bumps into a combined window bump, and, in a block 604, the computing system can determine a delta delay corresponding to the timing window for the signal based on the combined window bump. The computing system, in some embodiments, can utilize the combined window bump to determine initial switching alignments for the drivers of the victim channel and at least one aggressor channels. The computing system can then implement an iterative simulation process utilizing the initial switching alignments to identify the delta delay. Embodiments of block 604 will be described in greater detail in FIG. 7.

In a block 605, the computing system can determine whether the victim channel operates within a timing constraint associated with the circuit design based on the delta delay. The computing system can utilize the delta delays to determine worst-case early and late arrival times of signals on the victim channel, compare the worst-case early and late arrival times of signals with a timing specification for the circuit design. The timing specification can describe constraints on the electronic device represented by the circuit design. In some embodiments, the computing system can determine whether signals on the victim channel can arrive too early or too late to conform with the timing specification for the electronic device represented by the circuit design. The computing system, in some embodiments, can generate one or more signal integrity reports, which can indicate whether signaling on the victim channel conforms with the timing specification.

Figure 7:
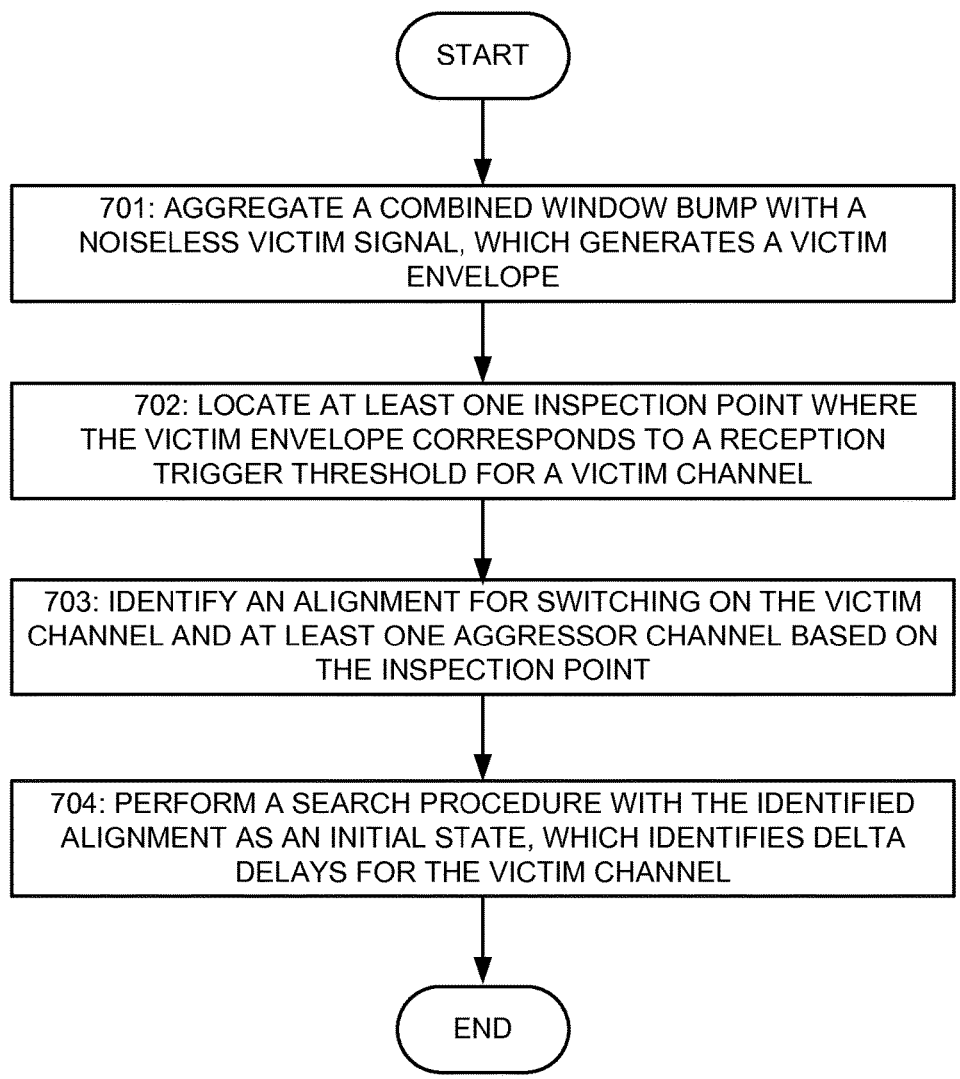
FIG. 7 illustrates a flowchart showing an example implementation of delta delay determination with a window bump-based aggressor alignment scheme according to various examples of the invention.

FIG. 7 illustrates a flowchart showing an example implementation of delta delay determination with a window bump-based aggressor alignment scheme according to various examples of the invention. Referring to FIG. 7, in a block 701, a computing system can aggregate a combined window bump with a noiseless victim signal, which generates a victim envelope, and, in a block 702, the computing system can locate at least one inspection point where the victim envelope corresponds to a reception trigger threshold for a victim channel.

In a block 703, the computing system can identify an alignment for switching on the victim channel and at least one aggressor channel based on the inspection point. For example, since the inspection point corresponds to a specific point on the victim envelope, the computing system can determine when drivers for the victim channel and at least one aggressor channel switched in order to generate that specific point on the victim envelope. The temporal relationship between the switching of the drivers for the victim channel and at least one aggressor channel can correspond to the identified alignment.

In a block 704, the computing system can perform a search procedure with the identified alignment as an initial state, which identifies delta delays for the victim channel. In some embodiments, the search procedure can include an iterative simulation of the circuit design identified alignment as the initial state. The iterative simulation can continue with realignment of the switching of the drivers for the victim channel and at least one aggressor channel based on prior simulation results until the computing system determines a final alignment that produces worst and best delta delays for the victim channel.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:
1. A method comprising:
 determining, by a computing system, a timing window for reception of a signal propagated through a victim channel in a circuit design;
 generating, by the computing system, an aggressor window bump for each aggressor channel capable of inducing a noise bump on the victim channel, wherein each aggressor window bump corresponds to a superimposition of a corresponding noise bump over a range of different potential arrival times on the victim channel for the corresponding noise bump, wherein the noise bumps correspond to voltage waveforms capable of being induced on the victim channel by the aggressor channels;
 selecting, by the computing system, a temporal alignment for switching of the signal received on the victim channel and switching of one or more of the noise bumps based, at least in part, on one or more of the aggressor window bumps;
 simulating, by the computing system, the circuit design with the switching of the signal received on the victim channel and the switching one or more of the noise bumps initially set in the temporal alignment to deter- mine a delta delay corresponding to the timing window for the signal propagated through the victim channel; and utilizing, by the computing system, the delta delay corresponding to the timing window for the signal to determine whether the victim channel operates within a timing constraint associated with the circuit design.

2. The method of claim 1, wherein the delta delay includes at least one time outside of the timing window that the signal propagated through the victim channel is capable of being received when one or more of the noise bumps are induced on the victim channel.

3. The method of claim 1, wherein generating the aggressor window bump for each noise bump is based, at least in part, on a magnitude associated with each noise bump and times when the aggressor channels are configured to induce each noise bump on the victim channel.

4. The method of claim 1, wherein generating the aggressor window bump for one of the noise bumps further comprises:
identifying times when the aggressor channels are configured to induce each noise bump on the victim channel; and
for each noise bump, compositing the noise bump corresponding to the different times to generate a corresponding aggressor window bump.

5. The method of claim 1, wherein determining the delta delay corresponding to the timing window for the signal propagated through the victim channel further comprises generating a victim envelope from the signal propagated through the victim channel and the aggressor window bumps, wherein identifying the temporal alignment for the switching of the signal received on the victim channel and the switching of the one or more of the noise bumps is performed according to when the victim envelope crosses a signal reception threshold at a receiver of the victim channel.

6. The method of claim 5, wherein generating the victim envelope further comprises:
combining the aggressor window bumps to generate a combined window bump; and
combining the signal propagated through the victim channel and the combined window bump, which generates the victim envelope.

7. The method of claim 5, wherein determining the delta delay corresponding to the timing window for the signal propagated through the victim channel further comprises:
adjusting the temporal alignment for the signal received on the victim channel and one or more of the noise bumps based on the results of the simulation; and
re-simulating the circuit design with the adjusted alignment for the signal received on the victim channel and one or more of the noise bumps to determine the delta delay corresponding to the timing window.

8. A system comprising:
a memory system configured to store computer-executable instructions; and
a computing system, in response to execution of the computer-executable instructions, is configured to:
determine a timing window for reception of a signal propagated through a victim channel in a circuit design;
generate an aggressor window bump for each aggressor channel capable of inducing a noise bump on the victim channel, wherein each aggressor window bump corresponds to a superimposition of a corresponding noise bump over a range of different potential arrival times on the victim channel for the corresponding noise bump, wherein the noise bumps correspond to voltage waveforms capable of being induced on the victim channel by the aggressor channels;
select a temporal alignment for switching of the signal received on the victim channel and switching of one or more of the noise bumps based, at least in part, on one or more of the aggressor window bumps;
simulate the circuit design with the switching of the signal received on the victim channel and the switching one or more of the noise bumps initially set in the temporal alignment to determine a delta delay corresponding to the timing window for the signal propagated through the victim channel; and
utilize the delta delay corresponding to the timing window for the signal to determine whether the victim channel operates within a timing constraint associated with the circuit design.

9. The system of claim 8, wherein the delta delay includes at least one time outside of the timing window that the signal propagated through the victim channel is capable of being received when one or more of the noise bumps are induced on the victim channel.

10. The system of claim 8, wherein the computing system, in response to execution of the computer-executable instructions, is configured to generate the aggressor window bump for each noise bump based, at least in part, on a magnitude associated with each noise bump and times when the aggressor channels are configured to induce each noise bump on the victim channel.

11. The system of claim 8, wherein the computing system, in response to execution of the computer-executable instructions, is configured to:
generate a victim envelope from the signal propagated through the victim channel and the aggressor window bumps; and
identify the temporal alignment for the switching of the signal received on the victim channel and the switching of the one or more of the noise bumps according to when the victim envelope crosses a signal reception threshold at a receiver of the victim channel.

12. The system of claim 11, wherein the computing system, in response to execution of the computer-executable instructions, is configured to:
combine the aggressor window bumps to generate a combined window bump; and
combine the signal propagated through the victim channel and the combined window bump, which generates the victim envelope.

13. The system of claim 11, wherein the computing system, in response to execution of the computer-executable instructions, is configured to:
adjust the temporal alignment for the signal received on the victim channel and one or more of the noise bumps based on the results of the simulation; and
re-simulate the circuit design with the adjusted alignment for the signal received on the victim channel and one or more of the noise bumps to determine the delta delay corresponding to the timing window.

14. An apparatus comprising at least one computer-readable memory device storing instructions configured to cause one or more processing devices to perform operations comprising:
determining a timing window for reception of a signal propagated through a victim channel in a circuit design;
generating an aggressor window bump for each aggressor channel capable of inducing a noise bump on the victim channel, wherein each aggressor window bump corresponds to a superimposition of a corresponding noise bump over a range of different potential arrival times on the victim channel for the corresponding noise bump, wherein the noise bumps correspond to voltage waveforms capable of being induced on the victim channel by the aggressor channels;

select a temporal alignment for switching of the signal received on the victim channel and switching of one or more of the noise bumps based, at least in part, on one or more of the aggressor window bumps;

simulating the circuit design with the switching of the signal received on the victim channel and the switching one or more of the noise bumps initially set in the temporal alignment to determine a delta delay corresponding to the timing window for the signal propagated through the victim channel; and utilizing the delta delay corresponding to the timing window for the signal to determine whether the victim channel operates within a timing constraint associated with the circuit design.

15. The apparatus of claim 14, wherein the delta delay includes at least one time outside of the timing window that the signal propagated through the victim channel is capable of being received when one or more of the noise bumps are induced on the victim channel.

16. The apparatus of claim 14, wherein generating the aggressor window bump for each noise bump is based, at least in part, on a magnitude associated with each noise bump and times when the aggressor channels are configured to induce each noise bump on the victim channel.

17. The apparatus of claim 14, wherein generating the aggressor noise envelope for one of the noise bumps further comprises:

identifying times when the aggressor channels are configured to induce each noise bump on the victim channel; and for each noise bump, compositing the noise bump corresponding to the different times to generate a corresponding aggressor window bump.

18. The apparatus of claim 14, wherein determining the delta delay corresponding to the timing window for the signal propagated through the victim channel further comprises:

generating a victim envelope from the signal propagated through the victim channel and the aggressor window bumps; and identifying the temporal alignment for the switching of the signal received on the victim channel and the switching of the one or more of the noise bumps according to when the victim envelope crosses a signal reception threshold at a receiver of the victim channel.

19. The apparatus of claim 18, wherein generating the victim envelope further comprises:

combining the aggressor window bumps to generate a combined window bump; and combining the signal propagated through the victim channel and the combined window bump, which generates the victim envelope.

20. The apparatus of claim 18, wherein determining the delta delay corresponding to the timing window for the signal propagated through the victim channel further comprises:

adjusting the temporal alignment for the signal received on the victim channel and one or more of the noise bumps based on the results of the simulation; and re-simulating the circuit design with the adjusted alignment for the signal received on the victim channel and one or more of the noise bumps to determine the delta delay corresponding to the timing window.

* * * * *